No. 845,410. PATENTED FEB. 26, 1907.
J. GRIESHABER.
MACHINE FOR CUTTING AND DRESSING GRINDSTONES.
APPLICATION FILED NOV. 3, 1905.

3 SHEETS—SHEET 1.

Witnesses:
H. L. Ames.
B. Sommers

Inventor
Johannes Grieshaber.
by Henry Orth
atty.

No. 845,410. PATENTED FEB. 26, 1907.
J. GRIESHABER.
MACHINE FOR CUTTING AND DRESSING GRINDSTONES.
APPLICATION FILED NOV. 3, 1905.
3 SHEETS—SHEET 2.
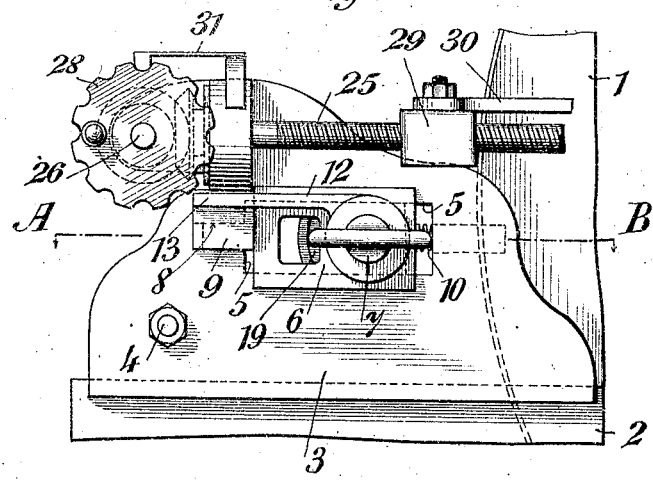
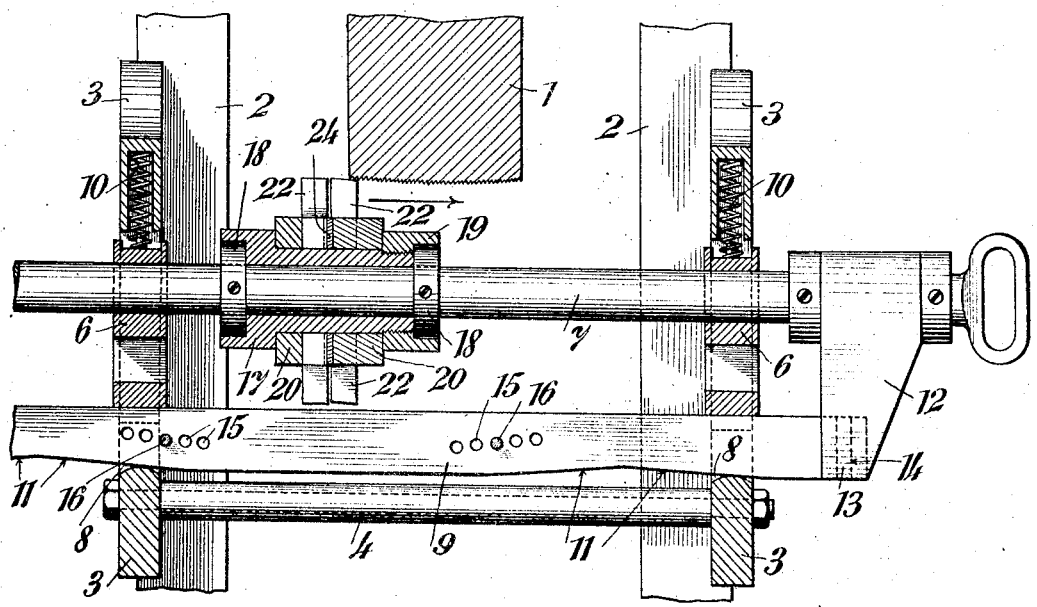
Witnesses
H. L. Amer.
B. Dommers
Inventor:
Johannes Grieshaber,
by Henry Orth, atty.

No. 845,410. PATENTED FEB. 26, 1907.
J. GRIESHABER.
MACHINE FOR CUTTING AND DRESSING GRINDSTONES.
APPLICATION FILED NOV. 3, 1905.

3 SHEETS—SHEET 3.

Witnesses:
H. L. Ames.
B. Sommers

Inventor:
Johannes Grieshaber,
by Harry Orth, atty

UNITED STATES PATENT OFFICE.

JOHANNES GRIESHABER, OF SCHAFFHAUSEN, SWITZERLAND.

MACHINE FOR CUTTING AND DRESSING GRINDSTONES.

No. 845,410.      Specification of Letters Patent.      Patented Feb. 26, 1907.

Application filed November 3, 1905. Serial No. 285,761.

*To all whom it may concern:*

Be it known that I, JOHANNES GRIESHABER, a citizen of the Republic of Switzerland, residing at Schaffhausen, in Switzerland, have invented new and useful Improvements in Machines for Cutting or Dressing Grindstones and the Like, of which the following is a specification.

This invention has for its object a machine for dressing or cutting grindstones and the like having a freely-revoluble cutting-roller lying opposite the periphery of the grindstone to be cut or dressed, which cutting-roller is adapted to share in the rotation of the grindstone and to execute a reciprocating motion corresponding to the thickness of the grindstone, and thereby to cut or dress the grindstone.

A form of construction of the object of the invention is shown as an example in the accompanying drawings, in which—

Figure 1:
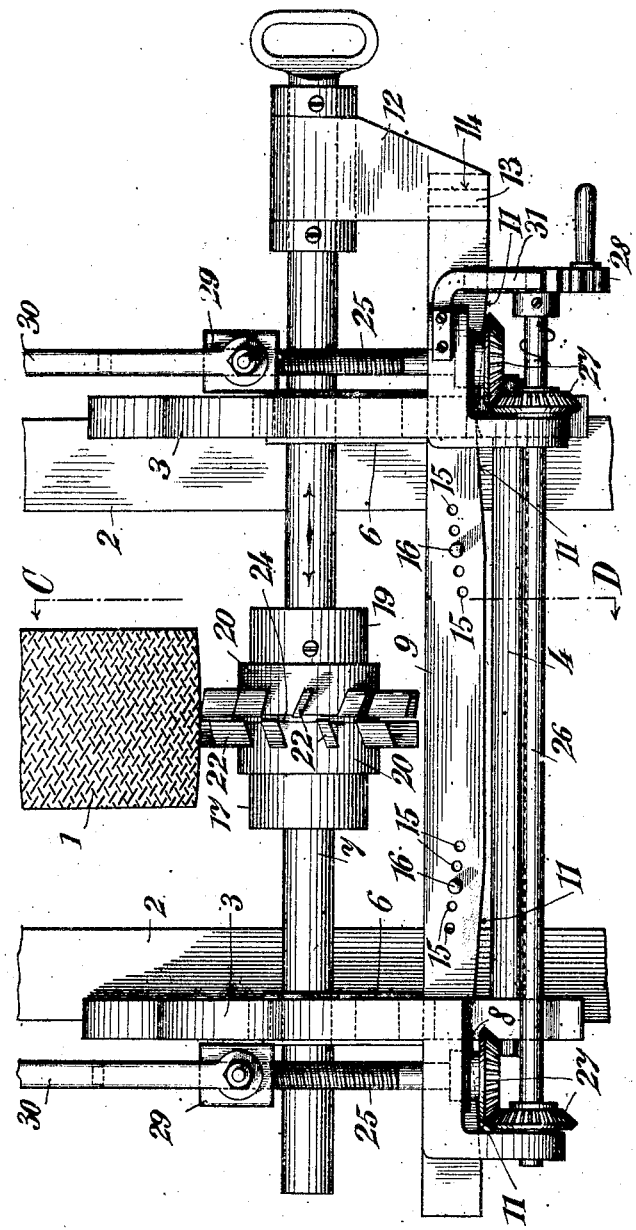
Figure 4:
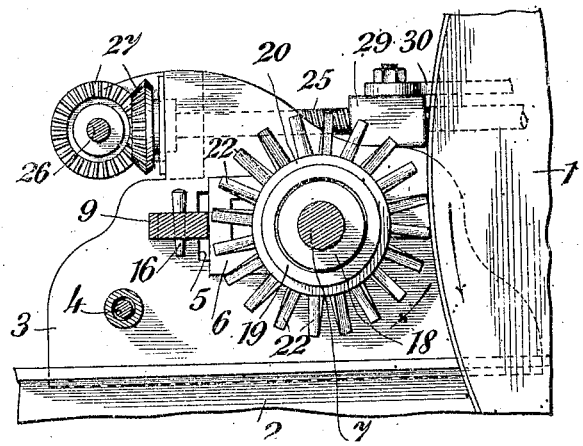
Figure 5:
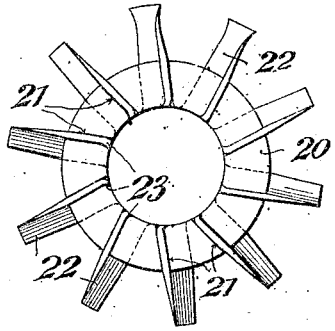

Figure 1 is a plan view; Fig. 2, an end view; Fig. 3, a section on the line A B of Fig. 2; Fig. 4, a section on the line C D of Fig. 1; Fig. 5, an elevation; and Fig. 6, a section, on an enlarged scale, of details.

1 is the grindstone.

2 are supports arranged one on each side of the grindstone, which supports may be attached to the grindstone-trough, (which is not shown.) 3 are shields mounted on these supports, which shields are held together by a screw 4. Bearings 6 are mounted in slots 5 of the shields, and in these bearings a spindle 7 is displaceably and revolubly mounted, which spindle is provided with a handle at one end. Parallel to this spindle a bar 9 is displaceably mounted in guides 8 of the shields 3, which guides are open toward the slots 5 and against one longitudinal side of which bar 9 the bearings 6 press under the action of springs 10, which thereby press the opposite longitudinal side of the bar, which side is provided with four rises or projections 11, firmly against the rounded ends of the guides 8, Figs. 1 and 3. Each two rises 11 extend from a common basis and extend uniformly in opposite directions.

On the end of the spindle 7, which is provided with a handle and projects outside one of the shields 3, a revoluble arm 12 is mounted, the free end of which arm rests on the bar 9 and has on its under side a projection 13, which engages in a suitable recess or notch 14 in the bar 9, whereby this latter may be coupled with the spindle, Figs. 1-3.

The bar 9 is provided with rows of holes 15, in which pins 16 may be inserted, which serve as stops between the shields and limit the displacement of the bar 9 and the spindle 7, Figs. 1, 3, and 4.

A sleeve or bush 17 is freely revolubly mounted between set-rings 18 on the spindle 7, and a knife or cutting-roller is clamped between a shoulder of the bush and a nut 19, screwed on one end of the bush. The knife-roller consists of two rings 20, which are provided with slots 21, lying in proximity to one another on their facing sides, in which slots cutters or knives 22 are inserted, the outer sharpened ends of which project beyond the periphery of the ring 20 and which are held by projections 23, Figs. 5 and 6. The rings 20 are so arranged to one another and the slots 21 in the same are so arranged that the knives 22 of one ring assume a position which is displaced relative to the knives of the other ring and also have a different pitch to them, Figs. 1, 3, and 4. One or more rings 24, Fig. 3, of soft metal—for instance, lead—are also preferably inserted between the two rings 20 in order to render softer the pressing together of the rings 20 by means of the nut 19 and to prevent a mutual displacement of the rings.

Screw-spindles 25, and transversely thereto a shaft 26, are mounted in the shields 3, which shaft is connected with the spindles by means of a pair of bevel-wheels 27 and carries a ratchet-wheel 28, provided with notches on its periphery. The spindles 25 are provided with nuts 29, on which links 30 are pivoted, which are connected with the support-frames of the grindstone, (these frames not being shown in the drawings.) By turning the shaft 26 in one direction or the other, the shields 3 may be displaced by the intermediary of the wheels 27, spindles 25, nuts 29, and links 30, and thereby the spindle 7 with the knife-roller approached to or removed from the periphery of the grindstone, the fixing of the means of transmission 25—28 being able to be operated by means of a set-spring 31, engaging in the notches of the wheel 28, Figs. 1 and 2.

The machine hereinbefore described works as follows: The knife-cylinder is brought into the middle of the width of the grindstone before it is dressed by displacing the spindle 7, and by turning the shaft 26 in the direction indicated by the arrow, Fig. 1, pressed firmly against the periphery of the grindstone, the basis of each two projections or rises 11 of the bar 9 lying against the rounded ends of the guides 8, Fig. 1. The cutting or knife roller or cylinder is set in rotation by the rotating grindstone, the sharp ends of the separate knives penetrating the stone. The shaft 7, with the knife-roller, and also the bar 9, coupled with the former, are then reciprocated, whereby the grindstone is dressed crosswise by the knives 22 over the whole width of its periphery, while the knife-roller is prevented passing beyond the width of the stone by the contact-pins 16, and thereby the knives are prevented from breaking off the edges of the grindstone.

The grindstone, during its dressing by means of the knife-roller, receives a domed form on its periphery, which is obtained in consequence of the arrangement of the swellings or rises 11 in the reciprocating movement of the bar 9 by the latter executing a displacement movement relative to the grindstone, which movement of displacement is directed transversely to the reciprocating movement and which increases toward the end thereof, whereby the knife-roller, starting from the middle of its displacement, is always pressed more and more against the grindstone, and thereby uniformly rounds off the same from the middle of its width toward both sides, Fig. 3. By adjusting the shaft 26 after each reciprocating movement of the knife-roller a deeper penetration of the knives 22 into the stone can be obtained, which operation is continued until the stone is suitably dressed over its entire periphery.

By the penetration of the knives into the grindstone the softer particles of the same are loosened and removed, while the harder constituents project therefrom the more accordingly, whereby each separate grain is given a greater grinding power, which is still further increased by the rounding or doming of the periphery of the grindstone.

Figure 6:
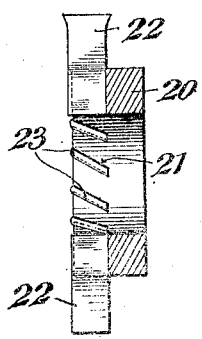

The knives 22 may, as shown separately in Figs. 5 and 6, be also widened or enlarged at their outer sharpened ends.

Having now particularly described and ascertained the nature of the said invention and in what manner the same is to be performed, I declare that what I claim is—

1. In a machine such as described, the combination with a dressing-tool, of mechanism to impart simultaneous axial and transverse movement to the tool during its rotation, including means movable simultaneously with said mechanism and during the axial movement thereof to proportion the transverse movement to the axial movement whereby a curved face is cut on the stone, substantially as described.

2. In a machine such as described, the combination with a revoluble cutter-shaft and bearings therefor, of means for axially moving the shaft and means operated by the axial movement of the shaft for transversely and simultaneously moving the bearings, substantially as described.

3. In a machine such as described, the combination with a revoluble cutter-shaft, of means to set the cutter to and from the stone to be dressed, means to axially slide said shaft and means connected to and slidable with the shaft to transversely reciprocate the shaft and cutter, substantially as described.

4. In a machine such as described, the combination with an axially-slidable cutter-shaft, bearings for the shaft slidable transversely thereto, a bar connected to the shaft and slidable with it, said bar engaging the bearings to move them toward the stone being dressed during the revolution and axial movement of the shaft, substantially as described.

5. In a machine such as described, an axially-displaceable cutter-shaft and spring-urged bearings movable transversely to the shaft, of a bar coupled to and moving with said shaft, and against which the bearings are held, said bar having suitably-shaped guide-faces, whereby the cutter shaft is transversely moved to impart the desired curvature to the stone being dressed, substantially as described.

6. The combination with a pair of slidably-mounted shields and means to adjust them to and from the stone, of bearings slidable in the shields, a cutter-shaft mounted in the bearings and a bar detachably connected to the shaft and acting on the bearings to move them to and from the stone being dressed during the axial movement of the cutter, substantially as described.

7. In a machine such as described, the combination with a cutter-shaft and journals therefor, of means to axially move the shaft and a bar movable with the shaft to impart a transverse movement to the bearings and shaft, and adjustable stops in said bar to limit the axial movement of both shaft and bar and thereby limit the transverse movement of the shaft, substantially as described.

8. In a machine such as described, the combination with a dressing-tool and axially-movable shaft, of bearings for the shaft movable transversely to the shaft, means connected to the shaft and acting on the bearings to proportion the transverse movements of the tool and shaft during their rotation to their axial movement and means to independently move all of the aforementioned parts simultaneously to and from the stone being dressed, substantially as described.

In testimony whereof I have signed my name to this specification in the presence of two subscribing witnesses.

JOHANNES GRIESHABER.

Witnesses:
ERNST FISCHER,
A. LIEBERKNECHT.